(12) United States Patent
Maini

(10) Patent No.: US 6,811,140 B1
(45) Date of Patent: Nov. 2, 2004

(54) SHUT-OFF VALVE ASSEMBLY

(76) Inventor: Sanjeev Maini, WZ-92A Raja Garden, Ring Road, New Delhi 110 015 (IN)

( * ) Notice: Subject to any disclaimer, the term of this patent is extended or adjusted under 35 U.S.C. 154(b) by 0 days.

(21) Appl. No.: 10/130,143

(22) PCT Filed: Dec. 21, 1999

(86) PCT No.: PCT/IN99/00075
§ 371 (c)(1),
(2), (4) Date: Jul. 31, 2002

(87) PCT Pub. No.: WO01/46608
PCT Pub. Date: Jun. 28, 2001

(51) Int. Cl.[7] .............................................. F16K 31/50
(52) U.S. Cl. ........................ 251/264; 251/357; 251/214
(58) Field of Search ................................ 251/264, 273, 251/274, 357, 214; 137/315.28; 16/430, 422, 427, 432

(56) References Cited

U.S. PATENT DOCUMENTS

| | | | | |
|---|---|---|---|---|
| 89,749 A | * | 2/1869 | Hendrick | 137/243.5 |
| 138,968 A | * | 5/1873 | Waterbury | 16/432 X |
| 643,460 A | * | 2/1900 | Bischoff | 16/432 |
| 1,080,080 A | * | 12/1913 | Sessions | 16/432 X |
| 2,457,492 A | * | 12/1948 | Raybould | 251/357 X |
| 2,630,291 A | * | 3/1953 | Gifford et al. | 251/357 X |
| 2,718,373 A | * | 9/1955 | Henry | 251/357 |
| 2,969,218 A | * | 1/1961 | Shaw | 251/357 X |
| 3,275,290 A | * | 9/1966 | Siver | 251/214 X |
| 3,945,607 A | * | 3/1976 | Dashner | 251/357 |
| 4,249,717 A | * | 2/1981 | Thompson | 251/210 |
| 4,509,719 A | * | 4/1985 | Uomala et al. | 251/214 |
| 4,512,550 A | * | 4/1985 | Kocher | 251/214 |
| 4,550,896 A | * | 11/1985 | Hansen, III | 251/357 X |
| 4,630,636 A | * | 12/1986 | Cutcher | 137/315.28 |
| 4,801,125 A | * | 1/1989 | Kocher | 251/367 |
| 4,923,173 A | * | 5/1990 | Szymaszek et al. | 251/333 |
| 4,945,941 A | * | 8/1990 | Kocher | 251/214 X |

FOREIGN PATENT DOCUMENTS

| | | | |
|---|---|---|---|
| DE | 29 24 304 A | * | 12/1980 |
| DE | 86 32 244 U | * | 2/1987 |

* cited by examiner

Primary Examiner—Eric Keasel
(74) Attorney, Agent, or Firm—Ladas & Parry

(57) ABSTRACT

A shut-off valve assembly for refrigerant liquid and/or gases including a valve body (1) having an inlet port, an outlet port and a flat annular valve seat, and a bonnet (2) fitted on the valve body (1). The bonnet (2) is provided with an axially shiftable externally threaded valve stem (3). A mechanism (20) to move the valve stem (3) is rigidly fixed on the valve stem (3). A valve disk (4) is provided with a circular collar. An annular groove is provided adjacent to the circular collar to house a resiliently compressible deformable circular ring (5). The circular ring (5) is placed in the annular groove on the valve disc between the valve disc and seat ring. The circular ring operates to effect a seal in the fluid flow path without requiring maximum compression of the sealing ring between the sealing ring and the valve disc.

6 Claims, 3 Drawing Sheets

SHUT-OFF VALVE ASSEMBLY

FIELD OF THE INVENTION

The subject invention relates to a shutoff valve assembly for handling refrigerant liquids and/or gases.

More specifically, the subject invention relates to a valve assembly comprising a valve body, an internally threaded bonnet, an axially shiftable externally threaded valve stem provided in the bonnet, a hand-wheel, a valve disc, a circular collar provided around the outer surface of the said valve disc, an annular groove provided adjacent to the said circular collar to house the resiliently compressible deformable circular ring, a circular disc provided in the center of the lowermost portion of the said valve disc having a pair of holes, a sealing ring, a retainer plate rigidly fixed to the lower portion of the said valve disc.

The embodiment of the invention resides in an annular resiliently deformable backseat bush fitted in the said annular groove, a conical annular seat provided at the lower end of the said valve stem above the said valve disc wherein the said annular seat is seated against the said resiliently deformable backseat bush to ensure that the refrigerant liquids and/or gases are not allowed to escape in the event of the replacement of gland packing More specifically, the invention relates to a resiliently deformable back-seat sealing bush, wherein the conical annular seat is seated against the said backseat bush to avoid the leakage of refrigerant liquids and/or gases, while replacing the gland packing.

The other embodiment of the invention resides in the flat face of the sealing ring which is pressed against the flat annular valve seat surface in the valve body.

Yet, another embodiment of the invention resides in the resiliently deformable compressible circular ring provided under the sealing ring providing a full proof sealing.

Another embodiment of the invention resides in the lower conical portion of the valve stem which is rounded at its lower most portion to accommodate the hollow cavity of the innermost portion of the valve disc.

The object of the invention is to avoid the closing down of the system in case of removal or replacement of gland packing, after the same is worn-out besides providing complete leak proof sealing.

Prior Art

Large industrial and commercial refrigeration systems employ refrigerants, such as ammonia, freon and the like, which are circulated through the system at high pressure in gaseous and liquid form.

These refrigerants are costly and a leakage in a large system not only reduces system efficiency but adds to cost of operation. Such systems require relatively large stop valves to control fluid flow. Such valves typically comprised either a one piece cast iron valve body with integrally formed threaded inlet and outlet flow tubes to which threaded pipe ends were connected, or a valve body fabricated of various components secured together by gas or electric welding techniques.

U.S. Pat. No. 86,749 claims a cast iron valve body to avoid such leakage. While cast iron valve bodies, being integral members may reduce the possibilities of leakage, casting is a complex and costly technique requiring separate molds for each valve size.

Conversely, prior art valve bodies fabricated of conventionally welded components are complex in design and methods of fabrication, introduce potential weak spots and are not easily kept clean during manufacture.

Various types of valve spindle stuffing box arrangements were employed to seal against leakage of high pressure past the valve spindle. Also, various valve seating arrangements were employed to ensure proper valve closure. Threaded connections on the valve body, whether casted or welded, very often proved to be prone to fluid loss. Furthermore, valve seat and valve disc designs and valve spindle stuffing box designs, often dictated by the configuration of a cast iron valve body, were susceptible to wear and tear is requiring servicing and replacement of seals to prevent leakage.

Shut-off valves are used in various systems to control the flow of liquids and/or gases and are particularly well suited to control the flow of refrigerants in gaseous and/or liquid states, which are circulated under extremely high pressure in refrigeration system. Such valves typically ranges in size from ¼ inches to 12 inches, when measured with reference to the diameter of the valve's inlet or outlet ports.

A typical shut-off valve generally comprises of a valve housing having an inlet port, an outlet port and an annular valve seat within the housing between the two ports. An externally threaded rotatable valve stem extends through an internally threaded, sealed valve stem opening in the housing and is provided at its lower end with a circular valve disc which is axially movable into and out of engagement with the annular valve seat as the valve stem is rotated between closed-and open positions respectively.

The prior art teaches various forms of sealing means which aim to improve the seal between the valve disc and the annular seat to prevent the undesirable leakage through the valve when the valve is closed. In one known prior art type of disc-type shut off valve used in high pressure refrigeration system, the valve disc located at lower end of the rotatable valve stem takes the form of conical metal member which presses the conical metal valve seat made on the valve body. The chances of leakage at the valve seat where the metal to metal contact is sealing the joint, was very high. The sealing between the valve stem and the valve body is effected by asbestos/non-asbestos sealing material which is tightly packed between the valve stem and the valve body. The sealing material eventually get corroded due to the friction and has to be replaced. It is very difficult to replace the packing when the plant is under pressure. For such replacement, the valve is to be isolated first and then the packing known as gland packing is removed and replaced with fresh material of gland packing.

In conventionally available shut-off valves, the valve disc is connected to the valve stem in such a manner that some space for relative movement is possible between them, so that the valve disc can adjustably position itself on the valve seat. The valve disc has an annular groove and an annular ring. The annular groove is formed around the outer periphery of the lower surface of the valve disc. The annular ring is made up of plastic such as Teflon. The plastic annular sealing ring is held in place on the valve disc by a smaller circular metal retainer plate which is attached to the lower surface of the valve disc and bears against the under side of the sealing ring. The retainer plate is secured to the valve disc by a number of bolts extending through holes in the retainer plate and screw into threaded bolt holes in the valve disc. When the valve is closed, the lower corner edge or flat face of the plastic annular sealing ring bears against the annular conical shaped/flat faced metal valve seat surface in the valve body.

Since, there is high fluid pressure conditions existing at the underside of the valve, when the valve is closed, there is always a possibility of gas or liquid leakage through a space between the rear side of the retainer plate and the front side of the sealing ring, through a second space between the inner edge of the sealing ring and the side edge of the annular groove in the valve disc and through a third space between the rear side of the sealing ring and the bottom of the annular groove in the valve disc. Furthermore, the result of such leakage is that high pressure liquid in the aforesaid second place causes the resilient plastic sealing ring to expand or to be urged laterally or circumferentially outward relative to the groove due to the fluid pressure in the aforementioned second space. With the passage of time, such a phenomenon has the effect of permanently deforming and losing the plastic sealing ring and increasing the possibility of undesirable fluid leakage through the aforesaid flow-paths when the valve is fully closed.

U.S. Pat. No. 4,801,125 teaches the use of stop valve, where the different components are welded together and assembled.

In an another U.S. Pat. No. 4,512,550, a shut-off or stop valve is claimed wherein the hollow internally threaded bonnet is screwed on to the externally threaded outer end of the valve sleeve, where the sealing material is entrapped to ensure that there is no leakage.

Yet another U.S. Pat. No. 4,923,173 teaches the disc-type stop valve, in which, when the valve is closed, the lower corner edge of the sealing ring bears against conical shaped annular metal valve seat surface in the valve body, where a "O" ring is placed at the rear side of the retainer plate. It has been found in such type of arrangement that the "O" ring is compressed permanently with the help of bolts and does not serve the purpose of leak-proof sealing, when there is high pressure.

Charles E. Gifford et. al. in U.S. Pat. No. 2,630,291 relates to a fluid controlling valves and is particularly adapted among other uses in connection with valves for refrigerating systems, with special reference to a fluid tight joint comprising a body member having an access opening through a wall thereof, a removable closure member movable toward and away from said body member for opening and closing said opening to provide access to interior of said body member; said members having telescoping portions defining a chamber, deformable sealing means within said chamber, one of said members having a venting passageway with one portion opening externally of said one member and a second portion opening into said chamber. In the telescoping portion of a first of said members have portions of different diameters.

Dashner et al. in U.S. Pat. No. 3,945,607 teaches a safety valve for use in gaseous service at elevated temperatures, including a casing provided with an annular valve seat and a selectively moveable valve member in, having mounted thereon a plastic annular sealing ring for seating on the valve seat.

Hence, efforts to prevent fluid leakage by the phenomenon described hereinbefore entails tightening the bolts as much as possible so that the plastic sealing ring is tightly compressed in the groove of the valve disc by the metal retainer plate which traps the sealing ring in the groove. However, because the TEFLON® sealing ring required the application of a great deal of force to compress it even for the small amount, and the bolts invovled were necessarily relatively small and few in number, application of the bolts of high torque required to sufficiently compress the sealing ring often resulted in shearing the bolts or thread damaged, thereby substantially increasing the cost of maintenance of replacing the valve.

Moreover, conventionally, the conical seat on the valve stem is pressed against the metal surface of the bonnet for preventing gas leakage which does not give full-proof sealing and secondly, the metal surfaces get corroded.

To overcome the abovementioned drawbacks, a leak proof shut-off valve for handling high-pressure refrigerant liquids or gases comprising a valve body having a fluid passage therethrough has been invented. A bonnet above the valve body is fitted through bolts with the valve body or is screwed onto the internally threaded valve body. The asbestos or non-asbestos ring is provided between the bonnet and the valve body to avoid any leakage through the joints. A valve disc is held with valve stem and sealing ring is fitted on the valve disc. The bonnet is internally threaded through which a rotatable and axially shiftable externally threaded valve stem is screwed to the hub of a hand wheel which is rotatable to open and close the valve.

The lower surface of the bonnet is provided with an annular groove. An annular resiliently deformable backseat seal bush made up of PTFE, Graphite, TEFLON® or PTFE-Carbon filled fibers is fitted on the said annular groove. A conical annular seat is there on the external surface of the valve stem.

The hand wheel of the valve fitted on the valve stem, when rotated in the clock wise direction, presses the valve disc against the front metal valve seat preventing the flow of liquid and/or gaseous refrigerant giving leak proof sealing. When the hand wheel is rotated anti-clockwise direction, the conical valve seat on the valve stem is pressed against the resiliently deformable backseat bush which ensures the leak proof sealing.

A valve disc located at the lower end of the rotatable valve stem takes the form of a solid cylindrical metal member having an annular groove formed around the periphery of its lower surface in which annular plastic sealing ring is disposed. When the valve is closed, the lower corner edge or flat face of the sealing ring is pressed against the conical shaped/flat annular valve seat surface in the valve body. The sealing ring is secured by a circular metal retainer plate which is smaller in diameter than the sealing ring. The bottom corner of the sealing ring is in conical/flat shape. When the valve is closed, the conical/flat face of the sealing ring is pressed against the conical/flat metal valve seat in the valve body.

A resiliently compressible deformable circular ring is provided in an annular space in valve disc. The said circular ring is placed in an annular groove on valve disc between the valve disc and seat ring. The circular ring operates to effect a seal in the fluid flow path without requiring maximum compression of the sealing ring between the sealing ring and the valve disc.

Accordingly, the subject invention relates to a shutoff valve assembly for refrigerant liquid and/or gases comprising a valve body having an inlet port, an outlet port and a flat annular valve seat provided within the said valve body between the said ports an internally threaded bonnet sealingly fitted on the said valve body to provide a leak proof assembly an axially shiftable externally threaded valve stem provided in the said internally threaded bonnet enabling the said valve stem to move axially while providing circular rotation to the said valve stem a mechanism to move the valve stem rotatably a valve disc provided at the lower end of the said valve stem a circular collar provided around the outer surface of the said valve disc an annular groove provided adjacent to the said circular collar to house the resiliently compressible deformable circular ring a circular disc provided in the center of the lowermost portion of the said valve disc having a pair of holes a sealing ring having the outer diameter conforming to the inner diameter of the said circular collar and inner diameter conforming to the outer diameter of the said circular disc, compressing the said resiliantly compressible deformable circular ring placed at the bottom end of the said valve disc, rigidly secured by the said circular collar overlapping the said circular ring, and a a retainer plate having a diameter more than the diameter of the said circular disc, rigidly fixed to the lower portion of the said valve disc holding the said sealing ring The embodiment of the invention resides in a shut-off valve assembly for refrigerant liquid and/or gases comprising a valve body having an inlet port, an outlet port and a flat annular valve seat provided within the said valve body between the said ports an internally threaded bonnet sealingly fitted on the said valve body to provide a leak proof assembly an axially shiftable externally threaded valve stem provided in the said internally threaded bonnet enabling the said valve stem to move axially while providing circular rotation to the said valve stem a mechanism to move the valve stem rotatably a valve disc provided at the lower end of the said valve stem a circular collar provided around the outer surface of the said valve disc an annular groove provided adjacent to the said circular collar to house the resiliently compressible deformable circular ring a circular disc provided in the center of the lowermost portion of the said valve disc having a pair of holes a sealing ring having the outer diameter conforming to the inner diameter of the said circular collar and inner diameter conforming to the outer diameter of the said circular disc, compressing the said resiliantly compressible deformable circular ring placed at the bottom end of the said valve disc, rigidly secured by the said circular collar overlapping the said circular ring a retainer plate having a diameter more then the diameter of the said circular disc, rigidly fixed to the lower portion of the said valve disc holding the said sealing ring an annular resiliently deformable backseat bush fitted in the annular groove formed in the inner lower surface of the said bonnet around the said valve stem a conical annular seat provided at the lower end of the said valve stem above the said valve disc wherein the said annular seat is seated against the said resiliently deformable backseat bush to ensure that the refrigerant liquids and/or gases are not allowed to escape in the event of the replacement of gland packing.

Yet another embodiment of the invention also resides in a shut-off valve assembly for refrigerant liquid and/or gases comprising a valve body having an inlet port, an outlet port and a flat annular valve seat provided within the said valve body between the said ports an internally threaded bonnet sealingly fitted on the said valve body to provide a leak proof assembly an axially shiftable externally threaded valve stem provided in the said internally threaded bonnet enabling the said valve stem to move axially while providing circular rotation to the said valve stem a hand-wheel having grooves on both sides of the surfaces rigidly fixed to the said valve stem providing maximum gripping strength a valve disc provided at the lower end of the said valve stem a circular collar provided around the outer surface of the said valve disc an annular groove provided adjacent to the said circular collar to house the resiliently compressible deformable circular ring a circular disc provided in the center of the lowermost portion of the said valve disc having a pair of holes a sealing ring having the outer diameter conforming to the inner diameter of the said circular collar and inner diameter conforming to the outer diameter of the said circular disc, compressing the said resiliantly compressible deformable circular ring a retainer plate having a diameter more then the diameter of the said circular disc, rigidly fixed to the lower portion of the said valve disc holding the said sealing ring and the said resiliently compressible circular ring in position an annular groove formed in the inner lower surface of the said bonnet around the said valve stem;

an annular resiliently deformable backseat bush seated in the said annular groove a conical annular seat provided at the lower end of the said valve stem above the said valve disc having a diameter greater than the diameter of the said valve stem wherein the said conical annular seat is seated against the said resiliently deformable backseat bush to provide an air-tight joint ensuring no escape for the leakage of the refrigerant liquids and/or gases upwards in the event of the replacement of gland packing a conical annular seat having a pair of projections provided at its lower end portion, the lower end of the said conical annular seat is rounded to be fitted in the matching conical hollow cavity provided in the inner surface of the said valve disc a pair of locking screws provided on the outer portion of the said valve disc for movably fixing the said lower rounded portion of the said valve stem in the said valve disc a locking spring provided in the groove on the outer surface of the said valve disc for securing said locking screws.

The hand wheel of the shut-off valve assembly of the subject invention is having grooves provided on both the surfaces of the said hand-wheel having diametrically opposite curvature, three supporting angles are provided at equidistance to provide a better gripping power.

The valve body of the said shut-off valve assembly is made up of metal. The said resiliently deformable back-seat bush is made up of the material selected from PTFE, graphite, TEFLON®, PTFE-carbon filled fiber and the like.

The sealing ring is made up of TEFLON® while the said resiliently deformable compressible circular ring is a solid ring made up of plastic and the like material.

The subject invention can better be understood with reference to the accompanying drawings. However, the

DETAILED DESCRIPTION OF THE INVENTION

Figure 1:
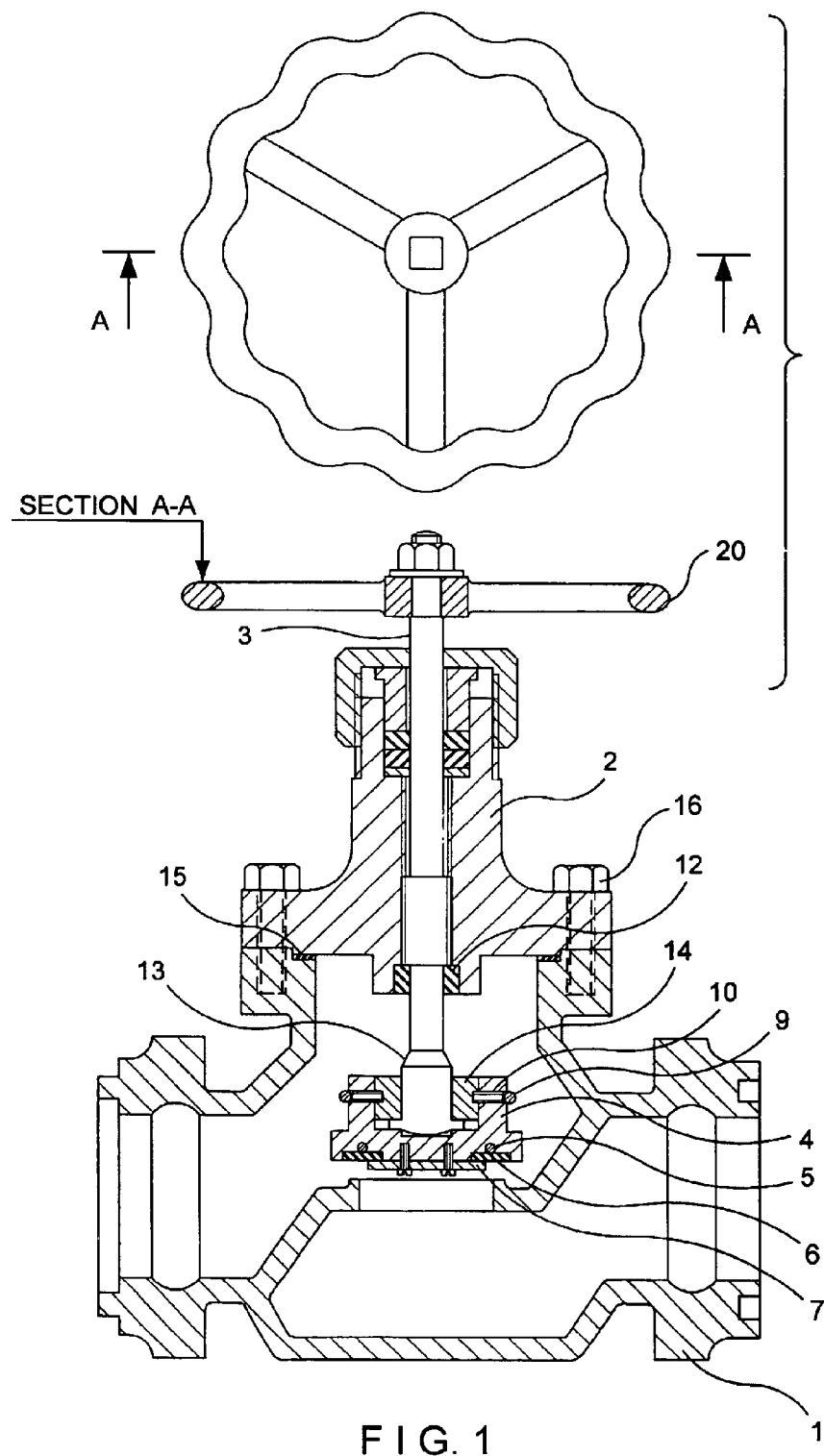
FIG. 1 depicts the vertical cross-sectional view of a flanged connection shut-off valve.
Figure 2:
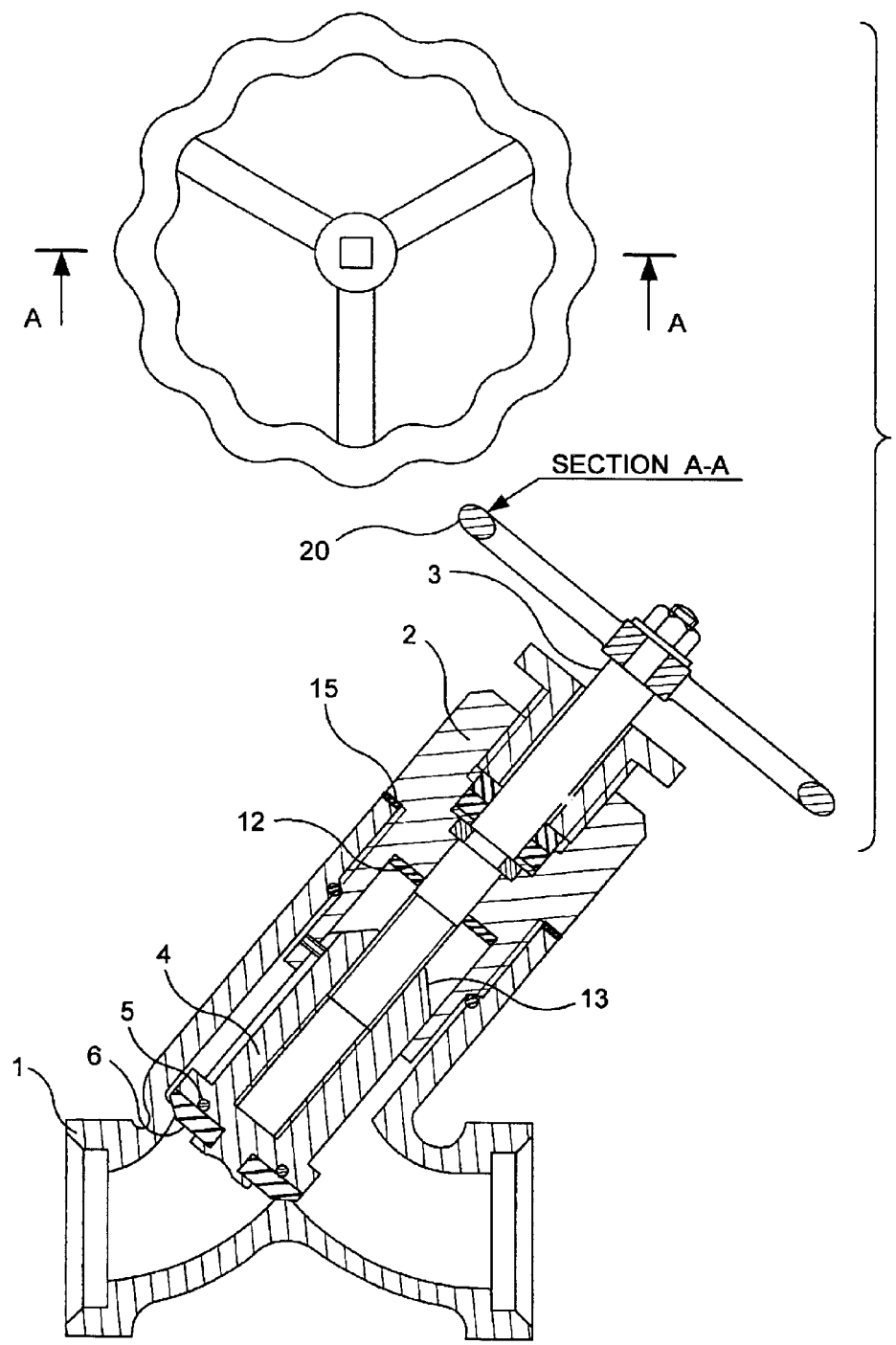
FIG. 2 depicts the vertical cross-sectional view of a weld-in-line shut-off-valve.
Figure 3:
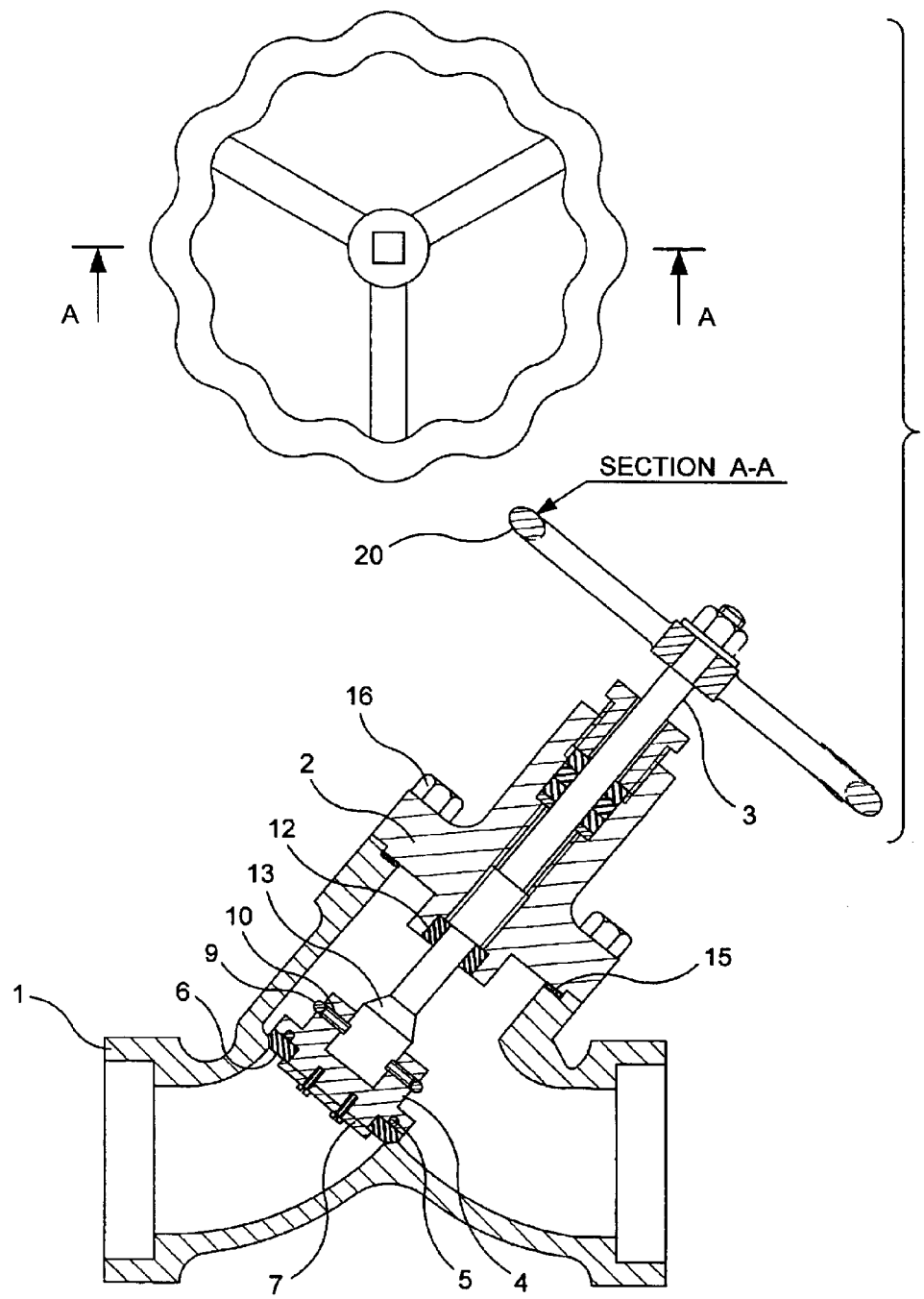
FIG. 3 depicts the vertical cross-sectional view of a weld-in-line shut-off-valve with conical seating sealing means.

A leak proof shut-off valve of the subject invention for handling refrigerant liquids/or gases comprises a valve body (1) having a fluid passage therethrough and a bonnet (2) fitted above the valve body (1) through bolts (16) or screwed onto the internally threaded valve body (1). A gasket (15) made up of asbestos or non-asbestos is provided between the bonnet (2) and the valve body (1) to avoid any leakage through the joints. A valve disc (4) is held with valve stem (3). A sealing ring (6) is fitted on the valve disc (4). The bonnet (2) is internally threaded through which a rotatable and axially shiftable externally threaded valve stem (3) is screwed to the hub of a hand wheel (20) which is rotatable to open and close the valve. A pair of locking screws (10) are provided on an outer portion of the valve disc (4) for movably fixing a lower rounded portion of the valve stem (3) in the valve disc (4). A locking spring (9) is provided in a groove on an outer surface of the valve disc (4) for securing the lock screws (10).

The lower surface of the bonnet (2) is provided, with an annular groove. An annular resiliently deformable plastic backseat seal bush (12) made up of PTFE, Graphite, Teflon or PTFE-Carbon filled fibers is fitted on the said annular groove. A conical annular seat (13) is there on the external surface of the valve stem (3).

The hand wheel (20) of the valve fitted on the valve stem, when rotated in the clock wise direction, presses against the front metal valve seat which prevents the flow of liquid and gaseous refrigerant and gives leak proof sealing. When the hand wheel (20) is rotated anti-clockwise direction, the conical valve seat (13) on the valve stem (3) is pressed against the resiliently deformable plastic bush (12) thus, ensuring leak proof sealing.

The valve disc (4) located at the lower end of the rotatable valve stem (3) takes the form of a solid cylindrical metal member having an annular groove formed around the periphery of its lower surface in which annular plastic seal ring (6) is fitted. When the valve is closed, the lower corner edge or flat face of the sealing ring (6) is pressed against the conical shaped/flat annular valve seat surface in the valve body. The sealing ring (6) is secured by a circular metal retainer plate (7) which is smaller in diameter than the sealing ring (6). The bottom corner of the sealing ring (6) is in conical/flat shape. When the valve is closed, the conical/flat face of the sealing ring (6) is pressed against the conical/flat metal valve seat in the valve body (1).

A circular resiliently deformable compressible circular ring (5) is disposed in an annular space in valve disc (4). The circular ring (5) is placed in annular groove on valve disc between valve disc (4) and sealing ring (6). The circular ring (5) operates to effect a seal in the fluid flow path without requiring maximum compression of the plastic sealing ring (6) in between sealing ring and the valve disc (4).

The subject invention is a mere statement of invention and various improvements thereof are possible, hence, the same should not be construed to restrict the scope of the invention.

What is claimed is:

1. A shut-off valve assembly for refrigerant liquid and/or gases comprising:

a valve body having an inlet port, an outlet port and a flat/conical annular valve seat provided within the said valve body between the said ports an internally threaded bonnet sealingly fitted on the said valve body to provide a leak proof assembly an axially shiftable externally threaded valve stem provided in the said internally threaded bonnet enabling the said valve stem to move axially while providing circular rotation to the said valve stem a hand-wheel having grooves on both sides of the surfaces rigidly fixed to the said valve stem providing maximum gripping strength a valve disc providing at a lower end of the said valve stem a circular collar provided around the outer surface of the said valve disc an annular groove provided adjacent to the said circular collar to house the resiliently compressible deformable circular ring a circular disc provided in the center of the lowermost portion of the said valve disc having a pair of holes a sealing ring having the outer diameter conforming to the inner diameter of the said circular collar and inner diameter conforming to the outer diameter of the said circular disc, compressing the said resiliently compressible deformable circular ring placed at the bottom end of the said valve disc, rigidly secured by the said circular collar overlapping the said circular ring a retainer plate having a diameter more than the diameter of the said circular disc, rigidly fixed to the lower portion of the said valve disc holding the said sealing ring and the said resiliently compressible circular ring in position an annular groove formed in the inner lower surface of the said bonnet around the said valve stem an annular resiliently deformable backseat bush seated in the said annular groove formed in the inner lower surface of the said bonnet around the said valve stem a conical annular seat provided at the lower end of the said valve stem above the said valve disc having a diameter greater than the diameter of the said valve stem wherein the said conical annular seat is seated against the said resiliently deformable backseat bush to provide an air-tight joint ensuring no escape for the leakage of the refrigerant liquids and/or gases upwards in the event of the replacement of gland packing the conical annular seat having a pair of projections provided at its lower end portion, the lower end of the said annular seat is rounded to a semi-circular projection fitted in the matching conical hollow cavity provided in the inner surface of the said valve disc a pair of locking screws provided on the outer portion of the said valve disc for movably fixing the said lower rounded portion of the said valve stem in the said valve disc a locking spring provided in the groove on the outer surface of the said valve disc for securing said locking screws.

2. A shut-off valve assembly for refrigerant liquid and/or gases as claimed in claim 1, wherein the said valve body is made up of metal.

3. A shut-off valve assembly for refrigerant liquid and/or gases as claimed in claim 1, wherein the said sealing ring is made up of PTFE.

4. A shut-off valve assembly for refrigerant liquid and/or gases as claimed in claim 1, wherein the said resiliently deformable compressible circular ring is a solid ring made up of rubber.

5. A shut-off valve assembly for refrigerant liquid and/or gases as claimed in claim 1, wherein said resiliently deformable back-seat bush is made up of the material selected from PTFE, graphite, and PTFE-carbon filled fiber.

6. A shut-off valve assembly for refrigerant liquid and/or gases as claimed in claim 1, wherein the said grooves provided on both the surfaces of the said hand-wheel are having diametrically opposite curvature and three supporting angles provided at equidistance to provide a better gripping power.

* * * * *